United States Patent Office 3,465,721
Patented Sept. 9, 1969

3,465,721
METHOD FOR REARING SILKWORMS
Homare Miyazawa and Shoichi Tarui, Ayabe, Masaki Kamada, Osaka, and Hiroshi Masuda, Sakai, Japan, assignors to Gunze Limited, Kyoto-fu, Japan, and Takeda Chemical Industries, Ltd., Osaka, Japan
No Drawing. Filed Oct. 13, 1967, Ser. No. 675,062
Claims priority, application Japan, Oct. 14, 1966, 41/67,765; June 12, 1967, 42/37,455
Int. Cl. A01k 67/04; A23k 1/00
U.S. Cl. 119—6                              7 Claims

ABSTRACT OF THE DISCLOSURE

Silkworms of the fourth and fifth stages are fed 2 to 4 times a day at about equal intervals such a restricted amount of shaped artificial diet as is consumed in about 3 to 5 hours, whereby high feed efficiency, far less labor force and uniform growth of the silkworms are realized.

---

The present invention relates to a method for rearing silkworms.

Silkworms have long been reared only on mulberry leaves for the production of silk, so that the rearing has inevitably been subjected to the conditions prevailing in the cultivation of mulberry trees and, therefore, the rearing could not help being restricted by the quantity and the quality of the mulberry leaves, as influenced by seasonal conditions. Recently, although it has been realized that silkworms can be reared entirely on artificial diets such as those disclosed in e.g. French Patents Nos. 1,392,752, 1,394,330 and 1,468,486 and United States Patents Nos. 3,230,930 and 3,275,446, etc., it has been found that these artificial diets are very perishable and liable to dry. Needless to say, decomposition of the diet due to its perishable nature, invites unfavorable conditions such as silkworm diseases or poor silkworm growth and, when the diet becomes dry, the silkworms do not eat it at all. Therefore, in the rearing of silkworms by artificial diet, it is necessary to refresh the diet several times a day, and at such times new diet must be fed after removing excess old diet and silkworm feces. However, this cleaning procedure requires not a small manpower. The difficulty remarkably increases just before and after of ecdysis of silkworms, because the silkworms at ecdysis spin to fix their bodies to something immovable such as the rearing seat, etc.

Further, in the hitherto known rearing of silkworms using artificial diet, the feed efficiency (weight of consumed diet/weight of fed diet) is very low, since the proper amount of artificial diet has not been known, which inevitably results in a great excess of feed, e.g. a several-fold excess vis-a-vis the weight of the diet actually consumed by the silkworms.

Another disadvantage of the rearing of silkworms using artificial diet is the irregularity of the growth degree of the silkworms. For example, 4 to 5 days difference in growth may be involved during the first to the fourth stage. Therefore, if the rearing of silkworms is continued on a merely regular basis, it becomes impossible to control the feeding amount of the artificial diet also in the fifth stage and to prevent excess feeding of the diet. Especially, as the quantity consumed at the fifth stage amounts to four-fifths of the total of all the stages, the "fed efficiency" is very greatly affected with the amount of the diet feed at the fifth stage. Furthermore, the irregularity of the growth degree of the silkworms causes irregularity in the moulting of the silkworms and requires increased manpower to select matured silkworms from those staying on the rearing seat.

It is an object of the present invention to enhance the feed efficiency of artificial diet for silkworms.

Another object of the present invention is to provide a simplified method for removing silkworm feces and left-over diet from the rearing seat.

Further object of the invention is to provide a method for making uniform the growth degree of silkworms being reared with artificial diet.

It is also a purpose of the present invention to provide a method for rearing silkworms, especially of the fourth and the fifth stage, on an industrial scale.

Other objects and advantages will become apparent from the following description.

In accordance with the present invention, the feeding amount of artificial diet is restricted to the amount which the silkworms may consume completely in about 3 to 5 hours and such restricted amount of diet is fed 2 to 4 times at equal intervals in a day. Thus, the amount of left-over diet is very greatly diminished. Even if the diet is completely consumed, the silk-worms are not fed until the next feeding time, so as to dry their rearing seat and to increase their appetite by allowing them to fast for a certain period of time. The optimally restricted amounts of artificial diet are exemplified in the following table:

AMOUNT OF ARTIFICIAL DIET PER 100 SILKWORMS (g.)/DAY (DRY BASIS)

| Stage | Day | | | | | | |
|---|---|---|---|---|---|---|---|
| | 1st | 2nd | 3rd | 4th | 5th | 6th | 7th |
| Fourth stage | 5-15 | 8-25 | 8-25 | 8-25 | 5-15 | 5-15 | |
| Fifth stage | 15-75 | 15-75 | 25-125 | 30-150 | 30-150 | 30-150 | 20-100 |

The most optimum amount in grams (g.) for the fifth stage is 20 to 60, 20 to 60, 30 to 120, 37 to 150, 34 to 135, 33 to 130 and 30 to 120 for the first to seventh day respectively.

The desirable combination of feeding time and fasting time is to make both periods of time equal to each other; therefore it is most desirable to repeat 4 hours of feeding and 4 hours of fast.

It is also important in the present process to make the artificial diet as thin as possible so that its spreading area becomes sufficiently wide for feeding silkworms. For this object, one dimension of the shaped diet falls into the range of, optimally, 0.3 to 3 mm. and, when thin-film type of diet is employed, diet of 0.4 to 1.2 mm. thickness is most desirable. The best range of thin film area of the diet for the fourth and the fifth stage per 100 silkworms is shown in the following table:

| Stage | Day | | | | | | |
|---|---|---|---|---|---|---|---|
| | 1st | 2nd | 3rd | 4th | 5th | 6th | 7th |
| The fourth stage (cm.²) | 70-280 | 85-340 | 105-420 | 120-480 | 135-540 | 135-540 | |
| The fifth stage (cm.²) | 200-800 | 300-1,200 | 350-1,400 | 450-1,800 | 500-2,000 | 600-2,400 | 600-2,400 |

The artificial diet can be fed in the form of rods having 1 to 3 mm. diameter, or of granules having 1 to 3 mm. diameter, or of strips having 1 to 3 mm. thickness, etc., the area of the rearing seat being the same as the thin-film area mentioned above. The filmy artificial diet is spread on a proper carrier plate (e.g. made from rubber, synthetic resin, aluminum, etc.) or the non-filmy artificial diet is scattered uniformly on a proper rearing seat. Silkworms eat the diet directly or through a net covering the diet. Or, in the case where silkworms are reared on the net on which the artificial diet is placed, a new net holding fresh diet is superposed upon the old net at a distance of 0.5 to 1 cm. so that silkworms on the old net may move up on to the upper net to eat the fresh diet.

The artificial diet for silkworms which can be used in the present invention is that provided by, for example, French Patents Nos. 1,392,752; 1,392,707; 1,394,330 and 1,468,486, United States Patents Nos. 3,275,446 and 3,230,930, etc. That is to say the artificial diet contains such ingredients as a biting factor which stimulates the silkworms to bite (e.g. β-sitosterol with or without flavonoids such as quercetin, morin, rutin, isoquercitrin), a swallowing factor which stimulates them to bite and swallow continuously (e.g. cellulose powder), poly hydroxy-carboxylic acid or its derivatives (e.g. chlorogenic acid, caffeic acid, gallic acid, gentisic acid, homogentisic acid, resorcylic acid, quinic acid, uronic acid, protocatechuic acid, etc.), hydroxybenzaldehyde (e.g. protocatechualdehyde, 3,4,5-trihydroxybenzaldehyde, 2,3-dihydroxybenzaldehyde, 2,4-dihydroxybenzaldehyde, 4-hydroxybenzaldehyde, 2,4,6-trihydroxybenzaldehyde, etc.), chlorine and its derivatives, nucleic acid or its derivatives, sugar, inorganic phosphate, inorganic silicate, inositol, etc. Components of such diets, which are helpful for the growth of silkworms, are for example, agar agar, sodium carboxymethylcellulose, methylcellulose, alginic acid; soybean powder, parched bean flour, defatted soybean powder, bean curd, dried fermented soybean powder, defatted and dried bean paste; cereal flour such as rice flour, barley flour, wheat flour, etc.; yeast products such as dry yeast, yeast extract, extracted fluid of yeast, extracted yeast cake; straw ashes; fish meal, animal or plant proteins; amino acids or their salts; vitamins (e.g. pantothenic acid, nicotinic acid, vitamin $B_1$, vitamin $B_2$, vitamin $B_6$, vitamin $B_{12}$, vitamin C, vitamin D, biotin, folic acid, vitamin K, vitamin E, vitamin P, inositol, orotic acid, α-lipoic acid, etc.); inorganic salts (e.g. calcium carbonate, sodium carbonate, sodium hydrogencarbonate, sodium chloride); honey or its products; pectin; enzymes; antibiotics (e.g. tetracycline, chlortetracycline, oxytetracycline, streptomycin, dihydrostreptomycin, neomycin, kanamycin, picromycin, leucomycin, erythromycin, oleandomycin, trichomycin, chloramphenicol, penicillin; sulfa drugs; furan derivatives; glucuronic acid or its salt, amine, or ester; and an attracting factor which attracts silkworms (terpenes such as citral, linalyl acetate, linalol, terpinyl acetate).

These artificial diet components are kneaded with water, steamed, made into proper form and then fed to the silkworms.

The silkworms are collected by filtering off coexisting solid materials e.g. silkworm feces and left-over diet, with a sieve which passes coexisting solid materials through but does not pass the silkworms themselves. When a net is employed as sieve in this procedure, a net having 3 to 6 mm. mesh for the fifth stage silkworms and having 2 to 4 mm. mesh for the fourth stage silkworms, is employed. This sieve may be used as a seat on which no artificial diet is placed, after screening off remaining left-over diet and feces. The screen may be set inclined 30 to 70°, on to which the silkworms and coexisting solid materials on the rearing seat are poured to cause the silkworms to roll down on the sieve to be collected in the acceptor placed at the lower part of the sieve, while the coexisting solid materials pass through the sieve. When an inclined sieve is used, the form of mesh is rectangular rather than round or square and, therefore a sieve having 3 to 6 mm. x 100 to 300 mm. mesh for the fifth stage or 2 to 4 mm. x 100 to 300 mm. mesh for the fourth stage is advantageously employed, or the sieve can be formed with wire strings arranged in parallel to each other, but not crossed, 3 to 6 mm. apart for the fifth stage or 2 to 4 mm. apart for the fourth stage. At the separation using a sieve as described above, the sieve is vibrated within the limit of not prejudicing the silkworm's growth, and a vibration of, for example, 10 to 100 times/second and an amplitude of 2 to 5 mm. is properly applied to silkworms at the fifth stage. When silkworms eat the diet through the net covering the diet, the separation of silkworms from the coexisting solid materials is simply performed by merely holding up the net with silkworms, leaving the coexisting solid materials on the diet carrier.

When the silkworms are reared on a net with an artificial diet, the diet can be refreshed by placing a new net with fresh diet upon the old net at a distance of 0.5 to 1 cm. to allow the silkworms to move up onto the upper net, while the coexisting solid materials are left on the under net which may be removed easily.

Furthermore, when fourth stage silkworms are reared in the above manner, the fourth moulting silkworms are left on the under net, because moulting silkworms do not go up to the upper net for further eating. Therefore, the silkworms which have simultaneously reached the moulting stage at the same time are separated from the coexisting solid materials and can be collected to rear them in the fifth stage.

Thus, an enhancement of the feed efficiency of artificial diet for silkworms and a minimization of the labor required for removing coexisting solid materials can be realized with a concomitant uniform growth degree of the silkworms reared on the artificial diet, by repeating the above operations, i.e., (A) the silkworms are reared on a first net with restricted amount of the artificial diet for a certain period of time ranging from ¼ to ½ day, a second net with restricted amount of the diet is put in place, and both nets are left standing for a certain period of time, during which period some or all of the silkworms reared on the first net go up to the second net, for seeking fresh diet, and repeating (B) the removal of the first net and placing of a third net with a fresh diet on the second net, and then leaving both nets (second and third) standing for a certain period of time and if, among silkworms reared on the first net, there are those which have already reached the fourth moulting stage, they are collected.

The net employed in this procedure may be made from metal such as copper, aluminum, stainless steel, etc., synthetic resin such as vinyl resin, polyethylene, polypropylene, polyester, polyamide, etc., natural fiber such as cotton, wool, hemp, etc., and such net is preferably stretched within a frame made of wood, metal, synthetic resins, etc. The mesh size of the net varies with the growth of the silkworms and falls within the range of 0.5 to 1.5 cm. for silkworms of the fourth stage and of 0.7 to 2.0 cm. for silkworms of the fifth stage. The space between the upper net and the under net may vary within the range of 0.5 to 1 cm. for silkworms of the fourth stage and of 1.0 to 2.0 for silkworms of the fifth stage.

In this specification, "g," "mg.," "mm.," "cm." and "cm.²" are "gram," "milligram," "millimeter," centimeter" and "square centimeter," respectively. Percentages are all on the weight basis, unless otherwise specified. The relationship between parts by weight and parts by volume is as that between grams and milliliters.

EXAMPLE 1

I. METHOD

The artificial diet composition shown in Table 1 is kneaded thoroughly and spread on a rubber plate, followed by steaming. The amount of diet and the spreading area are determined as shown in Table 2, the thickness of the diet being 0.5 to 0.9 mm.

Table 1.—Artificial diet composition

| Substance: | Amount used (part) |
|---|---|
| Mulberry leaf powder | 2.0 |
| Defatted soybean powder | 1.5 |
| Starch | 1.5 |
| Sucrose | 1.0 |
| Cellulose | 3.5 |
| Vitamin mixture [1] | 0.1 |
| β-Sitosterol | 0.05 |
| Inositol | 0.05 |
| $K_2HPO_4$ | 0.05 |
| Acetylcholine | 0.005 |
| Dihydrostreptomycin | 0.01 |
| Vitamin C | 0.05 |
| Water (volume part) | 16 |

[1] Vitamin mixture consists of vitamin $B_1 \cdot HCl$, vitamin $B_2$, vitamin $B_6$, nicotinic acid, calcium pantothenate, folic acid, biotin and vitamin Bt in the weight ratio of
10 : 10 : 10 : 20 : 20 : 2 : 2 : 10

TABLE 2.—DIET FOR THE FIFTH STAGE (G./100 SILKWORMS/TIME) AND AREA OF THIN-FILM DIET FOR THE FIFTH STAGE (CM.²/100 SILKWORMS)

| Day | 1st | 2nd | 3rd | 4th | 5th | 6th | 7th |
|---|---|---|---|---|---|---|---|
| Amount of dry diet (g.) | 11.0 | 12.7 | 20.0 | 25.0 | 22.7 | 21.7 | 20.0 |
| Area (cm.²) | 400 | 600 | 700 | 900 | 1,000 | 1,200 | 1,200 |

5000 silkworms in the fifth stage are put on the artificial diet and are allowed to eat the diet for 4 hours. Then, after the silkworm feces are removed by screening with a net, the silkworms are transferred to another rearing seat where no diet is fed, followed by being left standing 4 hours on the same rearing seat. After removing the silkworm feces again, the silkworms are transferred onto the artificial diet. This procedure is repeated 3 times a day for 7 days, then the silkworms go into moulting.

II. RESULTS

The process mentioned above is compared with the known process of feeding 100 to 200 g. dry diet per 100 silkworms per day in which neither the amount of diet nor the spread area of diet is determined.

A. Labor

In the case of rearing 5000 silkworms of the fifth stage, the known process requires 10 hours of labor per day of one man, while the present process requires only 1.5 hours of labor which is about one sixth of the labor hours required in the known process.

E.—COMPARISON OF INFLUENCES ON COCOON PRODUCTION

| Process | Percent of pupation | Weight of a cocoon (g.) | Weight of a cocoon layer (g.) | Cocoon layer ratio (percent) |
|---|---|---|---|---|
| Present process | 92 | 2.00 | 0.41 | 20.5 |
| Known process | 85 | 1.90 | 0.38 | 20.0 |

EXAMPLE 2

On a thin-film of artificial diet prepared in the same manner as that described in Example 1, there is closely put a net having 4 to 8 mm. mesh depending upon the growth of the silkworms. The silkworms are put on the net and they eat the diet through the meshes thereof. After completion of the feeding time, the net is lifted up to separate the silkworms from the diet and their feces, and the worms are allowed to fast. Further procedure is in the same manner as in Example 1 to give substantially the same results as in Example 1.

EXAMPLE 3

I. METHOD

The artificial diet kneaded in the same manner as in Example 1 is spread on an aluminum plate of 2 mm. thickness and is steamed. 5000 silkworms in the fifth stage are put on the diet and, after 4 hours, the aluminum plate is inclined to cause the silkworms and their feces to roll down on screening of stainless steel wire strings arranged in parallel, but not crossing each other, at a spacing of 4 mm. apart, said strings having a 2 mm. diameter and a length of 85 cm. and being set at a 30° incline to a vibrator operated by an electric motor turning at 30 times per second. The silkworms roll down onto an aluminum plate connected with the lower end of the sieve, followed by being left standing for 4 hours to allow them to fast, while the silkworm feces are screened off through the sieve. Then, the silkworms are transferred onto an aluminum plate on which the artificial diet is placed. This operation is repeated 3 times a day during 7 days and the silkworms go into moulting.

II. RESULTS

A. Labor per day for rearing 5000 silkworms of fifth stage

| | Hours |
|---|---|
| Present process | 1.5 |
| Known process | 10.0 |

B.—DIET FED [G. PER 100 SILKWORMS/DAY IN DRY BASIS]

| Process | Day | | | | | | | |
|---|---|---|---|---|---|---|---|---|
| | 1st | 2nd | 3rd | 4th | 5th | 6th | 7th | Total |
| Present process | 33.0 | 38.0 | 60.0 | 75.0 | 68.0 | 65.0 | 60.0 | 399.0 |
| Known process | 100.0 | 150.0 | 200.0 | 200.0 | 200.0 | 150.0 | 150.0 | 1,150.0 |

C.—WEIGHT OF CONSUMED DIET [DRY BASIS, G. PER 100 SILKWORMS/DAY]

| Process | Day | | | | | | | |
|---|---|---|---|---|---|---|---|---|
| | 1st | 2nd | 3rd | 4th | 5th | 6th | 7th | Total |
| Present process | 30.0 | 35.2 | 54.1 | 68.9 | 63.5 | 60.5 | 46.5 | 358.7 |
| Known process | 29.8 | 35.1 | 52.3 | 61.4 | 64.0 | 58.1 | 41.2 | 341.9 |

D.—FEED EFFICIENCY [(WEIGHT OF CONSUMED DIET IN DRY BASIS/WEIGHT OF FED DIET)×100]

| Process | Day | | | | | | | |
|---|---|---|---|---|---|---|---|---|
| | 1st | 2nd | 3rd | 4th | 5th | 6th | 7th | Average |
| Present process | 90.9 | 92.6 | 90.2 | 91.8 | 93.4 | 93.9 | 77.5 | 90.0 |
| Known process | 29.8 | 23.4 | 26.2 | 30.7 | 32.0 | 38.7 | 27.4 | 29.7 |

B.—COMPARISON OF INFLUENCES ON COCOON PRODUCTION

| Process | Percent pupation | Weight of a cocoon (g.) | Weight of a cocoon layer (mg.) | Cocoon layer ratio (percent) |
|---|---|---|---|---|
| Present process | 93 | 1.90 | 362 | 19.0 |
| Known process | 94 | 1.95 | 358 | 18.4 |

EXAMPLE 4

I. METHOD

After the artificial diet kneaded in the same manner as in Example 1 is steamed, it is spread to a thickness of about 1 mm. 100 g. of thus prepared died is cut into strips and is put on a net of 7 mm. mesh, the net being stretched on a frame made of aluminum having 60 x 45 cm. inside measure and being 5 mm. high. The frame with net, on which the diet is set, is placed on an aluminum dish and 1000 silkworms, after 16 days from brushing off, are put on the diet, followed by being left standing for 8 hours.

Then, on the frame with net is placed a new frame with net on which artificial diet is placed. After being left standing for 8 hours, the upper frame is lifted about 2 cm. high and the lower frame is removed. The upper frame is set on the aluminum dish again and on the frame is mounted a new frame with net on which is placed artificial diet. The silkworms are reared by repeating this procedure. In these processes, the moulding silkworms are left behind on the lower frame separated from the unmoulting silkworms and the moulting silkworms are combined to rear them in their fifth stage. Thus, the silkworms with the same growth degree are collected.

The amount of diet and area of rearing seat in the fourth stage are determined according to the following table:

| Day | 1st | 2nd | 3rd | 4th | 5th |
|---|---|---|---|---|---|
| Amount of diet per 100 silkworms/day in dry basis (g.) | 7.5 | 12.5 | 12.5 | 12.5 | 7.5 |
| Area of rearing seat per 100 silkworms (cm.²) | 140 | 175 | 210 | 240 | 270 |

II. RESULTS

A. Labor per day for rearing 10,000 silkworms of the fourth stage

| | Hours |
|---|---|
| Present process | 0.5 |
| Known process | About 4.5 |

B. Missing silkworm ratio

| | Percent |
|---|---|
| Present process | 4.8 |
| Known process | 8.2 |

Example 5

After rearing 500 silkworms under germ-free conditions for 15 days, they are further reared by feeding an articficial diet in various amounts ranging from 75 to 300 mg./day/silkworm in the same manner as that described in Example 4. Number of silkworms reaching the fourth moulting is shown as follows:

| Day | Fed dry diet (mg./day/silkworm) | | | | | |
|---|---|---|---|---|---|---|
| | 75 | 100 | 150 | 200 | 250 | 300 |
| 16th | 7 | 12 | 5 | 7 | 1 | 1 |
| 17th | 79 | 88 | 75 | 92 | 98 | 134 |
| 18th | 121 | 126 | 83 | 100 | 111 | 133 |
| 19th | 67 | 80 | 65 | 63 | 80 | 63 |
| 20th | 67 | 67 | 63 | 42 | 43 | 40 |
| 21st | 42 | 17 | 33 | 17 | 18 | 15 |
| Total | 383 | 390 | 324 | 321 | 351 | 366 |
| Percent of silkworms reached to the fourth moulting | 77 | 78 | 65 | 64 | 70 | 73 |

Having thus disclosed the invention, what is claimed is:

1. In a method for rearing silkworms with artificial diet, the improvement comprising feeding silkworms of the fourth and fifth stage 2 to 4 times a day at about equal intervals such a restricted amount of shaped artificial diet as is consumed in about 3 to 5 hours, at least one dimensional extent of the shaped diet being about 0.3 to 3 millimeters.

2. A method as claimed in claim 1, wherein the diet is spread over an area of a rearing seat per 100 silkworms per day on dry basis as set forth in the following table:

| Day | Stage | |
|---|---|---|
| | Fourth stage (cm.²) | Fifth stage (cm.²) |
| 1st | 70–280 | 200–800 |
| 2nd | 85–340 | 300–1,400 |
| 3rd | 105–420 | 350–1,400 |
| 4th | 120–480 | 450–1,800 |
| 5th | 135–540 | 500–2,000 |
| 6th | 135–540 | 600–2,400 |
| 7th | | 600–2,400 |

3. A method as claimed in claim 1, wherein the silkworms are separated from coexisting solid material by screening them with a sieve which passes coexisting solid through but does not pass silkworms.

4. A method as claimed in claim 3, wherein the mesh size of the sieve is about 2 to 4 millimeters for the fourth stage and about 3 to 6 millimeters for the fifth stage.

5. A method as claimed in claim 1, wherein silkworms of the fourth stage are reared on a net on which artificial diet is placed, the net having 0.5 to 1.5 cm. mesh.

6. A method as claimed in claim 5, wherein a net, on which artificial diet is placed, is superposed on silkworms staying on a first net and, after the silkworms have moved up onto the upper net, the under net is taken away to remove coexisting solid materials.

7. A method as claimed in claim 6, moulting silkworms on the under net being separated from coexisting solid materials to rear them in a next stage.

References Cited

UNITED STATES PATENTS 3,295,983   1/1967   Kato et al. _____ 99—2

OTHER REFERENCES

Fukuda et al., Synthetic Diet for Silkworm Raising, "Nature," vol. 196, October 1962, pp. 53–54.

RICHALD F. MEDBERY, Primary Examiner

U.S. Cl. X.R.

99—2